(12) United States Patent
Sun et al.

(10) Patent No.: US 12,401,399 B2
(45) Date of Patent: Aug. 26, 2025

(54) TRANSMIT PRECODING MATRIX INDICATOR DESIGN FOR 8 TRANSMIT ANTENNA UPLINK OPERATION

(71) Applicant: Apple Inc., Cupertino, CA (US)

(72) Inventors: Haitong Sun, Cupertino, CA (US); Dawei Zhang, Saratoga, CA (US); Wei Zeng, San Diego, CA (US); Chunxuan Ye, San Diego, CA (US); Sigen Ye, San Diego, CA (US); Huaning Niu, Cupertino, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/363,808

(22) Filed: Aug. 2, 2023

(65) Prior Publication Data

US 2024/0056141 A1 Feb. 15, 2024

Related U.S. Application Data

(60) Provisional application No. 63/397,245, filed on Aug. 11, 2022.

(51) Int. Cl.
*H04L 1/02* (2006.01)
*H04B 7/0456* (2017.01)

(52) U.S. Cl.
CPC ................. *H04B 7/0469* (2013.01)

(58) Field of Classification Search
CPC . H04W 76/20; H04W 16/28; H04W 74/0808; H04W 72/02; H04L 5/0051; H04B 7/0626; H04B 7/0639

USPC .......................................... 375/267, 260, 262
See application file for complete search history.

(56) References Cited

U.S. PATENT DOCUMENTS

| | | | |
|---|---|---|---|
| 2018/0183503 A1* | 6/2018 | Rahman | H04B 7/0486 |
| 2020/0267701 A1 | 8/2020 | Park | |
| 2022/0329302 A1* | 10/2022 | Li | H04L 5/0051 |
| 2023/0087859 A1* | 3/2023 | Shahmohammadian | H04B 7/0617 370/329 |

FOREIGN PATENT DOCUMENTS

| | | |
|---|---|---|
| EP | 3480966 | 5/2019 |
| EP | 3860021 | 8/2021 |
| WO | 2018117738 | 6/2018 |

OTHER PUBLICATIONS

International Search Report for PCT/US2023/029829; Nov. 22, 2023.

(Continued)

*Primary Examiner* — Khai Tran
(74) *Attorney, Agent, or Firm* — Kowert, Hood, Munyon, Rankin & Goetzel, P.C.

(57) ABSTRACT

This disclosure relates to techniques for configuring 8 transmit antenna uplink operation in a wireless communication system. A wireless device and a cellular base station may establish a wireless link. The wireless device may receive an indication from the cellular base station of an 8 transmit antenna port uplink configuration to use, which may include a one or more transmit precoding matrix indicators. The wireless device may perform uplink communication with the cellular base station using the 8 transmit antenna port configuration.

20 Claims, 8 Drawing Sheets

(56) References Cited

OTHER PUBLICATIONS

Ericsson "SRS antenna switching with antenna virtualization", 3GPP TSG-RAN Working Group 4 (Radio) Meeting #100-e R4-2112827; Aug. 16, 2021.
International Search Report for PCT/US2023/029830; Nov. 24, 2023.
Lenovo "SRI/TMPI enhancement for enabling 8 TX UL transmission"; 3GPP TSG RAN WG1#109-e R1-2204168; May 9, 2022.
Spreadtrum Communications "Discussion on SRI/TPMI enhancement for enabling 8 TX UL transmission"; 3GPP TSG RAN WG1 #109-e R1-2203326 May 9, 2022.

* cited by examiner

| $L_{max}$ | SRI Bitwidth |
|---|---|
| 1 | 3 bits |
| 2 | 6 bits |
| 3 | 7 bits |
| 4 | 8 bits |
| 5 | 8 bits |
| 6 | 8 bits |
| 7 | 8 bits |
| 8 | 8 bits |

FIG. 6

Example $L_{max} = 8$, $R_{th} = 2$, $M = N$

| SRI | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Selected SRS Resources | 1 | 2 | 1 | 2 | 5 | 6 | 7 | 8 | {1,2} | {1,2,3} | {1,2,3,4} | {1,2,3,4,5} | {1,2,3,4,5,6} | {1,2,3,4,5,6,7} | {1,2,3,4,5,6,7,8} |

TRANSMIT PRECODING MATRIX INDICATOR DESIGN FOR 8 TRANSMIT ANTENNA UPLINK OPERATION

PRIORITY INFORMATION

This application claims priority to U.S. provisional patent application Ser. No. 63/397,245, entitled "Transmit Precoding Matrix Indicator Design for 8 Transmit Antenna Uplink Operation," filed Aug. 11, 2022, which is hereby incorporated by reference in its entirety as though fully and completely set forth herein.

FIELD

The present application relates to wireless communications, and more particularly to systems, apparatuses, and methods for configuring 8 transmit antenna uplink operation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for configuring 8 transmit antenna uplink operation in a wireless communication system.

According to the techniques described herein, it may be possible to use a sounding reference signal resource indicator to configure an 8 transmit antenna port configuration for a wireless device to use for a non-codebook-based uplink communication with a cellular base station. There may be several possible sounding reference signal resource indicator design options for such operation, including options that allow selection of any possible combination of sounding reference signal resources, as well as options that allow selection of a subset of possible combinations of sounding reference signal resources with lower signaling overhead.

Techniques are also described herein for using one or more transmit precoding matrix indicators to configure an 8 transmit antenna port configuration for a wireless device to use for a codebook-based uplink communication with a cellular base station. There may be several possible transmit precoding matrix indicator design options for such operation, including non-coherent codebook options that allow selection of any possible combination of sounding reference signal ports, as well as options that allow selection of a subset of possible combinations of sounding reference signal ports with lower signaling overhead. Options are also described for non-coherent codebook and partial coherent codebook designs that utilize multiple transmit precoding matrix indicators each configured to indicate a precoding matrix for a lower transmit antenna port count, and using those smaller precoding matrices to construct a precoding matrix for 8 transmit antenna port operation.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 6 is a table illustrating possible SRI bitwidths corresponding to possible maximum numbers of uplink transmission layers, according to some embodiments;

FIG. 7 is a table illustrating possible SRI values and the corresponding selected SRS resources for a rank threshold-based SRI design approach, according to some embodiments;

FIG. 8 illustrates possible precoding matrices that could be indicated by TPMI values for a rank threshold-based TPMI design approach, according to some embodiments;

FIG. 9 illustrates aspects of one possible example scenario in which a TPMI design approach is used in which multiple TPMIs for lower numbers of transmit antenna ports are provided for non-coherent codebook uplink operation, according to some embodiments;

Figure 1:
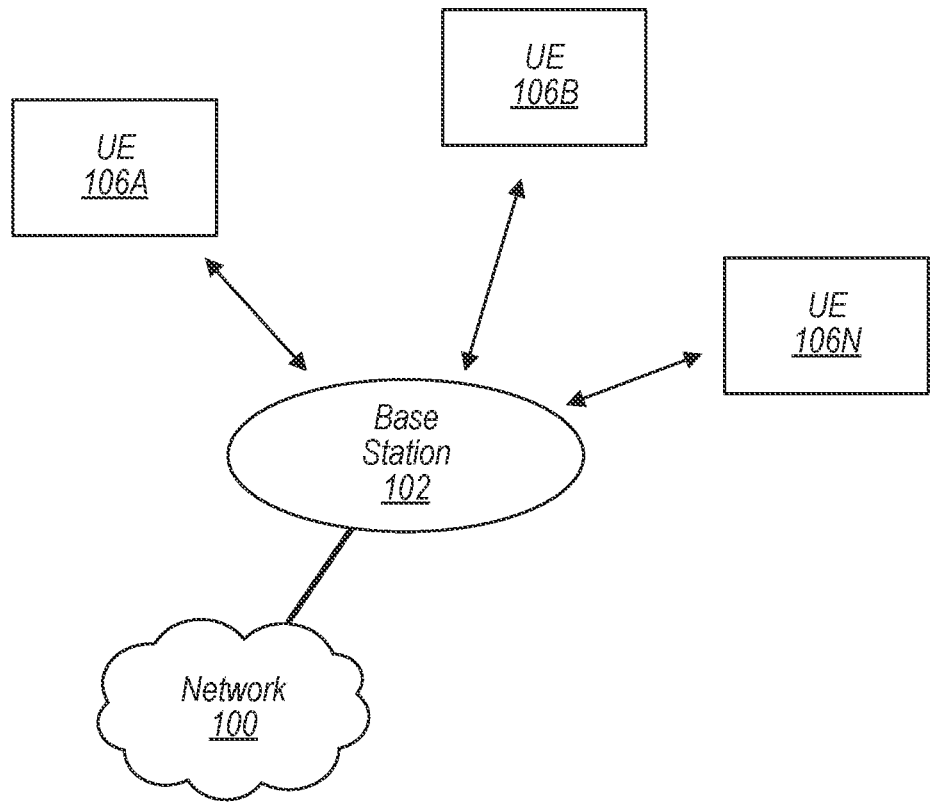
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
RRC: Radio Resource Control
MAC: Media Access Control
DCI: Downlink Control Information
PUSCH: Physical Uplink Shared Channel
SRS: Sounding Reference Signal
SRI: SRS Resource Indicator
TPMI: Transmit Precoding Matrix Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
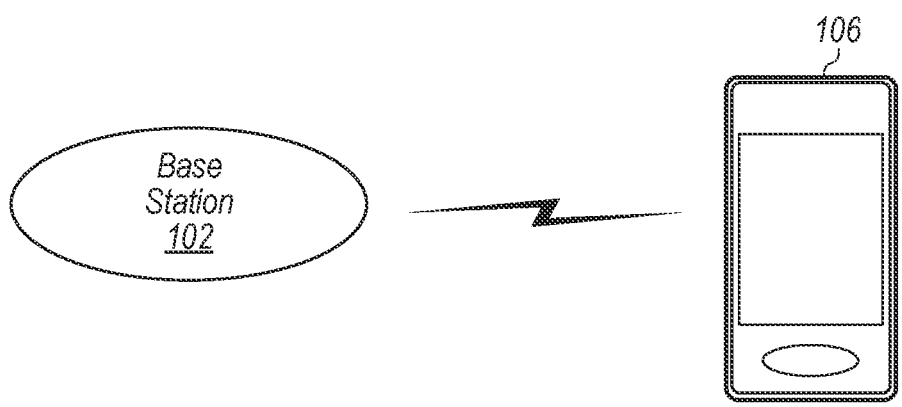
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for 8 transmit antenna uplink operation in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
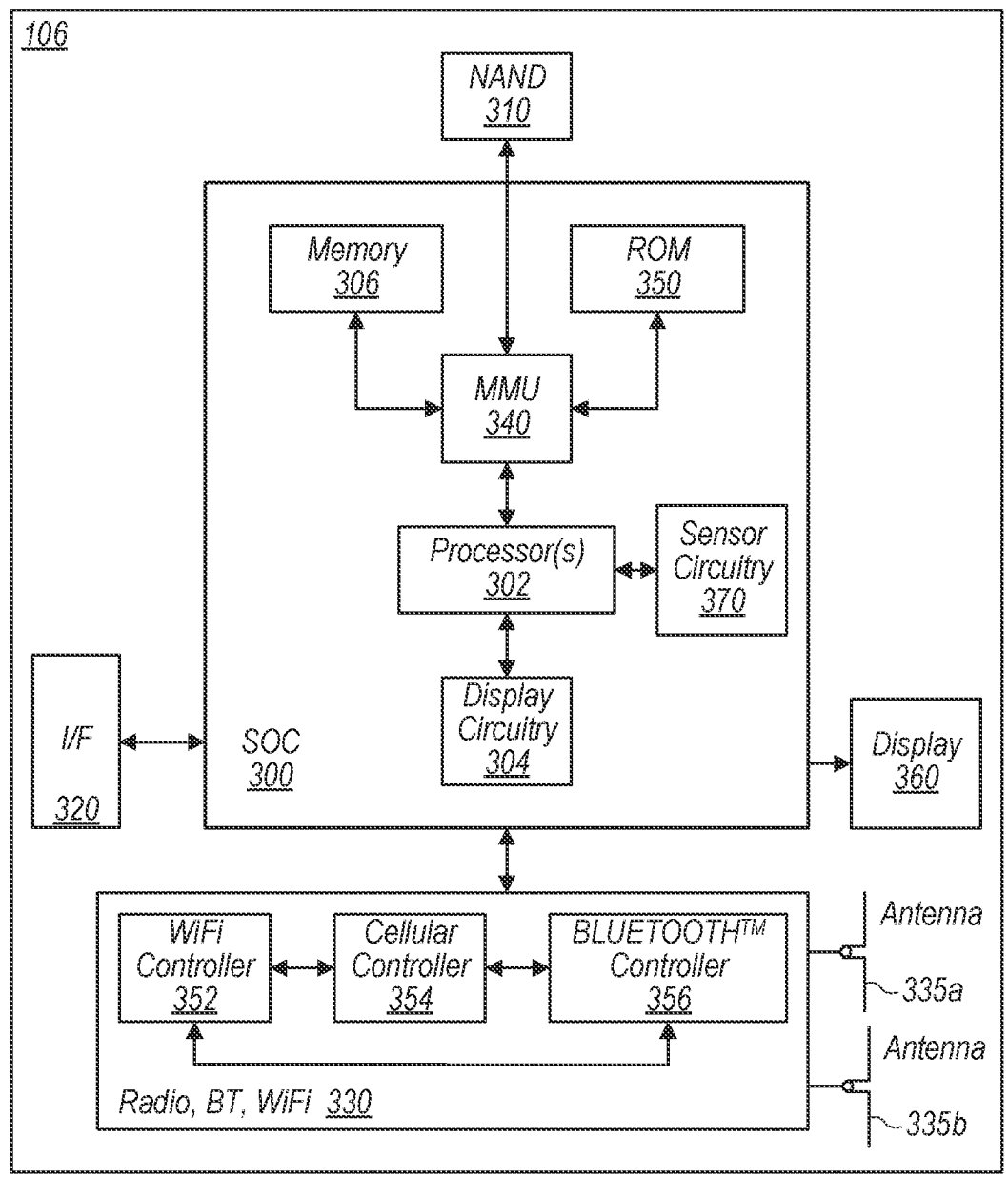
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for 8 transmit antenna uplink operation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for 8 transmit antenna uplink operation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
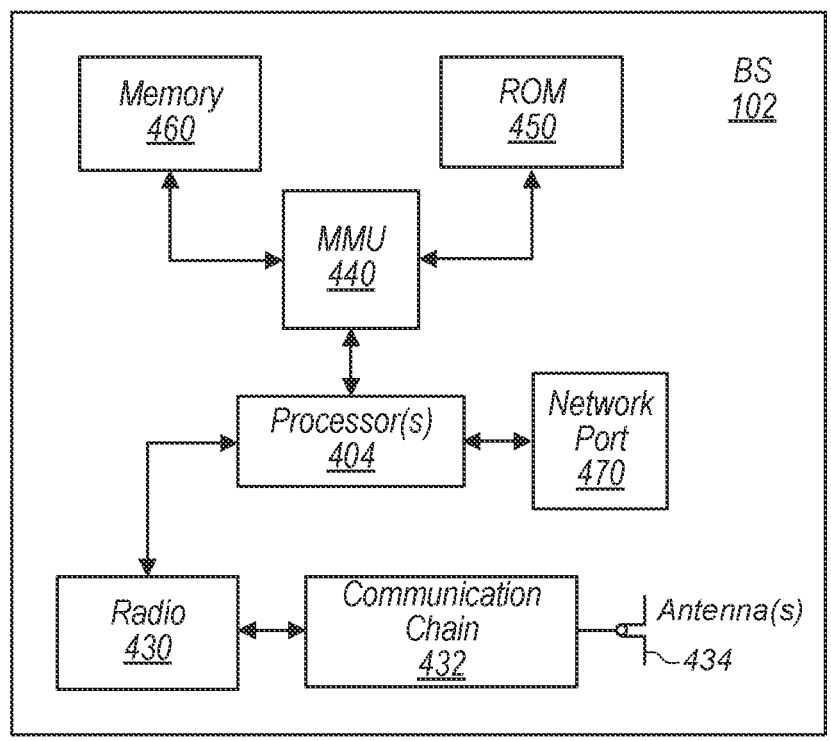
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSB s) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3(3PP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable amid-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrices may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

At least in some systems, uplink MIMO may also be possible. Codebook-based uplink MIMO may be performed, at least as one possibility, in which a transmit precoding matrix indicator (TPMI) is used to indicate a precoding matrix for a wireless device to use for uplink transmission. The codebook-based uplink MIMO can include non-coherent codebook operation (e.g., when there is no coherency between different uplink/transmit antennas), partial coherent codebook operation (e.g., when there is coherency between certain antenna elements, but no coherency between different coherent antenna groups), or full coherent codebook operation (e.g., when there is coherency between all antenna elements). Non-codebook-based uplink MIMO may also be possible, for example in scenarios in which the downlink and uplink channels are understood to be reciprocal. In such non-codebook-based uplink MIMO, a wireless device may perform sounding reference signal transmissions using different configurations (e.g., using different transmit antenna ports) on different sounding reference signal resources, and a sounding reference signal resource indicator can be used to indicate for which sounding reference signal resources the associated configurations should be included for the uplink transmit configuration.

FIG. 5—8 Transmit Antenna Uplink Operation Configuration

As noted previously herein, at least some cellular communication technologies may be capable of supporting multiple input multiple output (MIMO) uplink communication, for example with up to 4 uplink transmit antenna ports. Supporting use of multiple antenna ports for uplink communications may have the potential to increase throughput, provide additional robustness to challenging channel conditions, and/or provide any of a variety of other possible benefits, at least in some circumstances, albeit potentially at a higher cost (e.g., in terms of price, power consumption, form factor, complexity, etc.) than lower antenna-count designs and communication techniques. At least for some devices, it may be possible that the benefits of supporting uplink operation with a relatively large (e.g., more than 4) number of transmit antenna ports outweighs the costs. Accordingly, it may be useful to provide techniques for supporting such operation in a cellular communication system, at least in some instances.

Thus, it may be beneficial to specify techniques for supporting configuring 8 transmit antenna uplink operation. To illustrate one such set of possible techniques, FIG. 5 is a flowchart diagram illustrating a method for configuring 8 transmit antenna uplink operation in a wireless communication system, at least according to some embodiments.

Figure 5:
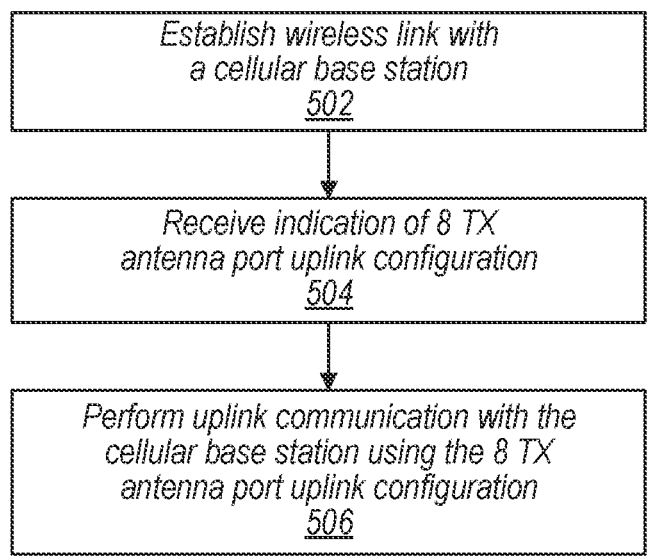
FIG. 5 is a flowchart diagram illustrating aspects of an exemplary possible method for configuring 8 transmit antenna uplink operation in a wireless communication system, according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNB s that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may receive an indication from the cellular base station of a TX antenna port configuration to use to perform an uplink communication. At least according to some embodiments, the configuration may be for more than 4 TX antenna ports (e.g., for 8 TX antenna ports, as one possibility). At least in some embodiments, the indication may be provided in downlink control information (DCI) that schedules the uplink communication.

There may be multiple possible types of indications that the cellular base station can provide to configure the wireless device for the uplink communication. As one possibility, for a non-codebook configuration, the wireless device may perform a sounding reference signal (SRS) transmission on each of multiple (e.g., 8, as one possibility) SRS resources, where each of the SRS resources is associated with a TX antenna port of the wireless device, and the cellular base station may provide a SRS resource indicator (SRI) to the wireless device to indicate which TX antenna port(s) to use of the available TX antenna ports (e.g., by indicating the SRS resources associated with those TX antenna ports.

For such a non-codebook approach, there may be multiple possible SRI designs that can support indication of an 8 TX antenna port (and/or other numbers of TX antenna ports) uplink configuration. As one possibility, the SRI may have a bitwidth equal to the number of uplink TX antenna ports for the wireless device (e.g., such that for 8 TX antenna port uplink configuration, the SRI may have an 8-bit bitwidth). In such a case, it may be possible that each bit in the SRI is associated with a SRS resource, and the cellular base station can indicate which TX antenna ports to use for the uplink configuration by setting the bits of the SRI to 1 for the SRS resources associated with the selected TX antenna ports.

As another SRI design approach, the SRI bitwidth may not be fixed, and may instead depend at least in part on how many uplink transmission layers are configured to be scheduled by the cellular base station for the wireless device for non-codebook based uplink operation (e.g., the upper limit or configured maximum number of uplink transmission layers for the wireless device). Such an approach may potentially reduce the bitwidth (and thus potentially reduce the signaling overhead to configure the uplink TX antenna port configuration for the wireless device) in at least some instances, such as if the number of uplink transmission layers that can be configured is less than the number of uplink TX antenna ports available at the wireless device. For example, in such a scenario, the total number of possible uplink TX antenna port combinations may be less than or equal a number that can be represented using fewer bits than the number of uplink TX antenna ports, in which case a correspondingly shorter SRI bitwidth may still be able to represent all possible uplink TX antenna port combinations that comply with the configured maximum number of uplink transmission layers for the wireless device.

The number of uplink transmission layers that can be scheduled by the cellular base station for the wireless device for non-codebook based uplink operation may be determined based on wireless device capability information (e.g., indicating the number of uplink transmission layers supported by the wireless device for non-codebook based uplink operation) provided from the wireless device to the cellular base station, radio resource control (RRC) configuration information provided from the cellular base station to the wireless device indicating the maximum number of uplink transmission layers configured to be scheduled by the cellular base station, or a combination thereof, among various possibilities. If the wireless device reports such capability information, it may be provided at any of various possible levels of granularity (e.g., per wireless device, per component carrier, per band, per band combination, per component carrier per band per band combination, etc.), according to various embodiments. If different capabilities are reported for different scenarios (e.g., for different component carriers in the same band per band combination, as one possibility), it may be possible that the smallest reported number is always used, or the largest reported number is always used, or that RRC configuration information can be used to determine which reported number is used on a more dynamic basis.

As another option for SRI design that may reduce the bitwidth needed to signal the TX antenna port configuration for a relatively large number of uplink TX antenna ports, it may be possible to implement an approach that utilizes a rank threshold in a manner that limits the number of possible combinations of SRS resources that can be selected for rank values equal to or greater than the rank threshold. In such a scenario, an uplink rank threshold may be determined for the wireless link between the wireless device and the cellular base station. The uplink rank threshold may be predetermined (e.g., in 3GPP technical specifications) or configured by the network (e.g., using RRC or media access control (MAC) control element (CE) signaling), as various possibilities. For rank values (e.g., number of uplink transmission layers) below the uplink rank threshold, the SRI may be designed to support selection of any combination of SRS resources from the SRS resources on which the wireless device performed SRS transmissions.

For rank values equal to or greater than the uplink rank threshold, the SRI may be designed to support selection of a subset of possible combinations of SRS resources on which the wireless device performed SRS transmissions. For example, for each possible number of uplink transmission layers N, it may be the case that the SRI supports selection of any combination of the SRS resources from the first M SRS resources of the SRS resources on which the wireless device performed SRS transmissions 0, where N≤M≤0. In such an example, it may be the case that the value of M is selected by the network, e.g., as depending on N (e.g., M=N, M=N+1, etc.), as a way of effectively managing the balance between flexibility to choose the uplink TX configuration from a greater possible number of choices versus higher signaling overhead to support such greater flexibility. Note that other techniques for limiting the subset of possible combinations of SRS resources for rank values equal to or greater than the uplink rank threshold are also possible.

In some instances, as a possible alternative to use of a single rank threshold, it may be possible to implement an approach that utilizes two complementary subsets of uplink rank values in a manner that limits the number of possible combinations of SRS resources that can be selected for rank values in one of the subsets of uplink rank values. In such a scenario, the first subset of uplink rank values can contain one or multiple uplink ranks, and the second subset of uplink rank values contains the uplink ranks not contained in the first. The subsets may be predetermined (e.g., in 3GPP technical specifications) or configured by the network (e.g., using RRC or MAC CE signaling), as various possibilities. In some instances, the first subset may include rank values with relatively few possible combinations of SRS resources, such as rank 1 and the rank equal to the number of TX antenna ports of the wireless device, as one possibility. Other ways of configuring the rank subsets are also possible.

For rank values in the first subset, the SRI may be designed to support selection of any combination of SRS resources from the SRS resources on which the wireless device performed SRS transmissions. For rank values in the second subset, the SRI may be designed to support selection of a subset of possible combinations of SRS resources on which the wireless device performed SRS transmissions. For example, for each possible number of uplink transmission layers N, it may be the case that the SRI supports selection of any combination of the SRS resources from the first M SRS resources of the SRS resources on which the wireless device performed SRS transmissions 0, where N≤M≤0. In such an example, it may be the case that the value of M is selected by the network, e.g., as depending on N (e.g., M=N, M=N+1, etc.), as a way of effectively managing the balance between flexibility to choose the uplink TX configuration from a greater possible number of choices versus higher signaling overhead to support such greater flexibility. Note that other techniques for limiting the subset of possible combinations of SRS resources for rank values in the second subset are also possible.

As a still further SRI design option, it may be possible that a custom SRI to SRS resource selection mapping can be configured. For example, if such a technique is supported, it may be the case that the cellular base station can provide to the wireless device SRI to SRS resource selection mapping information for the wireless device. The mapping information may indicate which SRI values indicate selection of which SRS resources. Such information may be used by the cellular base station to select the SRI to provide to the wireless device to indicate the selected SRS resource(s) for an uplink communication. Such information may also be stored by the wireless device and used to identify which SRS resource(s) (and corresponding TX antenna port(s)) is (are) selected for an uplink communication by the wireless device when the wireless device receives the SRI for the uplink communication. At least in some embodiments, the wireless device may provide capability information to the cellular base station to indicate whether the wireless device supports such custom SRI to SRS resource selection mapping, and/or to indicate the memory limit for the wireless device for storing such SRI to SRS resource selection mapping information (e.g., as a maximum number of SRI to SRS resource selection mapping entries supported by the wireless device, as one possibility). If the wireless device indicates a limited capability for storing such SRI to SRS resource selection mapping information, it may be the case that the cellular base station limits the SRI to SRS resource selection mapping information for the wireless device to be within the capability of the wireless device, at least according to some embodiments.

In some embodiments, it may be possible that the indication from the cellular base station of the TX antenna port configuration to use for the uplink communication includes one or more transmit precoding matrix indicators (TPMIs). One or more TPMIs may be used, for example, to provide a codebook-based TX antenna port configuration for the wireless device, potentially including a non-coherent codebook-based TX antenna port configuration, or a partial coherent codebook-based TX antenna port configuration.

As one possibility, for a non-coherent codebook-based TX antenna port configuration, the TPMI may have a bitwidth equal to the number of uplink TX antenna ports for the wireless device (e.g., such that for 8 TX antenna port uplink configuration, the TPMI may have an 8-bit bitwidth). In such a case, it may be possible that each bit in the TPMI is associated with a TX antenna port (or with an SRS resource that is in turn associated with a TX antenna port), and the cellular base station can indicate which TX antenna ports to use for the uplink configuration by setting the bits of the TPMI to 1 for the selected TX antenna ports/SRS resources.

As another possibility, a rank threshold-based approach to TPMI design may be used for certain TX antenna port counts (e.g., higher TX antenna port counts, such as 8 TX antenna ports). Similar to a rank threshold-based approach to SRI design, such an approach may have the potential to reduce the bitwidth needed to signal the TX antenna port configuration for a relatively large number of uplink TX antenna ports, albeit at a potential cost to scheduling flexibility. In such a scenario, an uplink rank threshold may be determined for the wireless link between the wireless device and the cellular base station. The uplink rank threshold may be predetermined (e.g., in 3GPP technical specifications) or configured by the network (e.g., using RRC or MAC CE signaling), as various possibilities. For rank values below the uplink rank threshold, the TPMI may be designed to support selection of any combination of TX antenna ports/SRS resources. For rank values equal to or greater than the uplink rank threshold, the TPMI may be designed to support selection of a subset of possible combinations of TX antenna ports/SRS resources. For example, for an 8 TX antenna port wireless device, for each possible number of uplink transmission layers N, it may be the case that the TPMI supports selection of any combination of the TX antenna ports/SRS resources from the first M TX antenna ports/SRS resources, where N≤M≤8. In such an example, it may be the case that the value of M is selected by the network, e.g., as depending on N (e.g., M=N, M=N+1, etc.), as a way of effectively managing the balance between flexibility to choose the uplink TX configuration from a greater possible number of choices versus higher signaling overhead to support such greater flexibility. Note that other techniques for limiting the subset of possible combinations of TX antenna ports/SRS resources for rank values equal to or greater than the uplink rank threshold are also possible.

An approach to TPMI design in which two rank subsets are used for certain TX antenna port counts (e.g., higher TX antenna port counts, such as 8 TX antenna ports) may also be possible. Similar to a rank subset-based approach to SRI design, such an approach may have the potential to reduce the bitwidth needed to signal the TX antenna port configuration for a relatively large number of uplink TX antenna ports, albeit at a potential cost to scheduling flexibility. In such a scenario, a first subset of uplink rank values may be determined for the wireless link between the wireless device and the cellular base station. The first subset may be predetermined (e.g., in 3GPP technical specifications) or configured by the network (e.g., using RRC or MAC CE signaling), as various possibilities. In some instances, the first subset may include rank values with relatively few possible combinations of TX antenna ports, such as rank 1 and the rank equal to the number of TX antenna ports of the wireless device, as one possibility. Other ways of configuring the rank subsets are also possible.

For rank values in the first subset, the TPMI may be designed to support selection of any combination of TX antenna ports/SRS resources. For rank values in the second subset (which may include any rank values possible for the wireless device that are not in the first subset, at least according to some embodiments), the TPMI may be designed to support selection of a subset of possible combinations of TX antenna ports/SRS resources. For example, for an 8 TX antenna port wireless device, for each possible number of uplink transmission layers N, it may be the case that the TPMI supports selection of any combination of the TX antenna ports/SRS resources from the first M TX antenna ports/SRS resources, where N≤M≤8. In such an example, it may be the case that the value of M is selected by the network, e.g., as depending on N (e.g., M=N, M=N+1, etc.), as a way of effectively managing the balance between flexibility to choose the uplink TX configuration from a greater possible number of choices versus higher signaling overhead to support such greater flexibility. Note that other techniques for limiting the subset of possible combinations of TX antenna ports/SRS resources for rank values in the second subset are also possible.

As a still further possibility, it may be possible to support higher numbers of TX antenna ports, for non-coherent codebook and/or for partial codebook uplink operation for a wireless device, by providing multiple TPMIs for smaller numbers of TX antenna ports. For example, for 8 TX antenna port non-coherent codebook uplink configuration, it may be possible for the cellular base station to provide two 4 TX antenna port TPMIs. According to such a design, it may be the case that the uplink transmission layer splitting between the TPMIs is performed in a fixed manner (e.g., as evenly as possible, with the first [N/2] PUSCH layers being indicated by the first TPMI and the remaining [N/2] PUSCH layers being indicated by the second TPMI, as one possibility). As another possibility, it may be the case that the uplink transmission layer splitting between the TPMIs can be flexibly determined by the network; for example, the network may indicate the total number of uplink transmission layers and the number of uplink transmission layers allocated to the first TPMI, as one possibility. Note that the number of uplink transmission layers for a TPMI may be limited to the number of TX antenna ports for the TPMI (e.g., no more than 4 uplink transmission layers for a 4 TX antenna port TPMI). A wireless device that receives multiple such TPMIs may construct a precoding matrix for uplink transmission based on the precoding matrices indicated by the multiple TPMIs; for example, each precoding matrix indicated by an indicated TPMI may be used to populate a corresponding portion of the precoding matrix for uplink transmission, with remaining (e.g., off-diagonal) portions of the precoding matrix for uplink transmission being populated with zeros.

For partial coherent codebook uplink configuration, it may be possible to provide a TPMI for each coherent antenna group of the wireless device. For example, for 8 TX antenna port partial coherent codebook uplink configuration, it could be possible for the cellular base station to provide four 2 TX antenna port TPMIs (e.g., for a wireless device with 4 coherent antenna groups with 2 antenna elements in each coherent antenna group), with one of the 2 TX antenna port TPMIs being associated with each of the coherent antenna groups. Similarly, it could be possible for the cellular base station to provide two 4 TX antenna port TPMIs (e.g., for a wireless device with 2 coherent antenna groups with 4 antenna elements in each coherent antenna group), with one of the 4 TX antenna port TPMIs being associated with each of the coherent antenna groups.

According to such a design, it may be the case that the uplink transmission layer splitting between the TPMIs is performed in a fixed manner (e.g., as evenly as possible, with each antenna group containing the same number of uplink transmission layers if the rank is evenly divisible by the number of coherent antenna groups, and one additional uplink transmission layer being allocated to coherent antenna groups in consecutive order to account for any additional uplink transmission layers if the rank is not evenly divisible by the number of coherent antenna groups, as one possibility). As another possibility, it may be the case that the uplink transmission layer splitting between the TPMIs can be flexibly determined by the network. Note again that the number of uplink transmission layers for a TPMI may be limited to the number of TX antenna ports for the TPMI (e.g., no more than 4 uplink transmission layers for a 4 TX antenna port TPMI). A wireless device that receives multiple such TPMIs may construct a precoding matrix for uplink transmission based on the precoding matrices indicated by the multiple TPMIs; for example, each precoding matrix indicated by an indicated TPMI may be used to populate a corresponding portion of the precoding matrix for uplink transmission, with remaining (e.g., off-diagonal) portions of the precoding matrix for uplink transmission being populated with zeros.

In 506, the wireless device may perform uplink communication with the cellular base station using the TX antenna port uplink configuration. According to some embodiments, the uplink communication may include a physical uplink shared channel (PUSCH) communication scheduled by the cellular base station using the same DCI that provides the indication of the TX antenna port uplink configuration. Thus, for example, for a scenario in which the wireless device is an 8 TX antenna port wireless device, the wireless device may perform a PUSCH transmission to the cellular base station using the selected 8 TX antenna port uplink configuration, which may be a non-codebook, non-coherent codebook, or partial coherent codebook 8 TX antenna port uplink configuration, e.g., in accordance with any of the various SRI and/or TPMI design approaches described herein, or a variation thereof.

Thus, at least according to some embodiments, the method of FIG. 5 may be used to provide a framework according to which a wireless device can be configured to perform cellular uplink communication with higher numbers of transmit antennas than are currently supported, which may allow for a greater diversity of wireless device types and possible use cases, among other possible benefits, at least in some instances.

FIGS. 6-12 and Additional Information

FIGS. 6-12 illustrate further aspects that might be used in conjunction with the method of FIG. 5 if desired. It should be noted, however, that the exemplary details illustrated in and described with respect to FIGS. 6-12 are not intended to be limiting to the disclosure as a whole: numerous variations and alternatives to the details provided herein below are possible and should be considered within the scope of the disclosure.

Cellular communication technologies may support multiple modes for uplink multiple input multiple output (MIMO) operation. For example, 3GPP 5G NR may support codebook based physical uplink shared channel (PUSCH) operation, as well as non-Codebook-based PUSCH operation. For codebook-based PUSCH operation, it may be possible that the precoding and number of layers can be indicated by the "precoding information and number of layers" field in the scheduling downlink control information (DCI). The existing possible precoding (e.g., transmit precoding matrix indicator (TPMI)) may be specified in 3GPP TS 38.211 v.17.2.0 and 3GPP TS 38.212 v.17.2.0, at least according to some embodiments. For non-codebook-based PUSCH operation, the precoding and number of layers may be indicated by the sounding reference signal (SRS) resource indicator (SRI) field in the scheduling DCI.

In NR, for codebook-based uplink MIMO operation, it may further be possible for NR to support three different coherence modes. These may include non-coherent (e.g., with codebookSubset="nonCoherent"), partial-coherent (e.g., with codebookSubset="partialAndNonCoherent"), and full-coherent (e.g., with codebookSubset="fullyandPartialandNonCoherent"), at least according to some embodiments. In existing NR operation, for uplink MIMO operation, it may be the case that up to 4 transmit (TX) antenna port operation and up to 4 layer PUSCH is supported.

For some devices (e.g., with fewer form-factor, price point, power consumption, and/or other constraints), it may be possible that uplink operation with more than 4 TX antenna ports is desirable. In order to support such operation, it may be useful to provide techniques for configuring uplink TX configurations for a wireless device for higher TX antenna port count operation (e.g., 8 TX antenna port operation and/or other TX antenna port counts).

Such techniques may include providing SRI design and/or TPMI design options for one or more of nonCodebook PUSCH operation, non-coherent codebook PUSCH operation, partial coherent codebook PUSCH operation, and/or fully coherent codebook PUSCH operation. Techniques are described herein at least for SRI design and TPMI design options for nonCodebook PUSCH operation, non-coherent codebook PUSCH operation, and partial coherent codebook PUSCH operation. For codebook-based PUSCH operation, "precoding information and number of layers" field design modifications that could be used in some instances are also described herein.

For 8 TX nonCodebook uplink operation, it may be possible to configure 8 SRS resources in SRS-ResourceSet configuration information, with usage parameter set to "non-Codebook", such that each SRS resource is configured with one port. In the scheduling DCI, the SRI field may be used to indicate the number of layers (e.g., the number of selected SRS resources), and for a given number of selected SRS resources, to identify which SRS resources are selected.

As one option for an SRI field design capable of indicating such information, it may be possible to use an 8-bit bitmap (e.g., the bitwidth of the SRI may be fixed to 8 for 8 TX antenna port uplink operation), where each bit of the bitmap is associated with a SRS resource, and if the bit associated with a SRS resource is set, that may indicate that the corresponding SRS resource is selected. In such a scenario, the SRI may be {$S_0$, $S_1$, $S_2$, $S_3$, $S_4$, $S_5$, $S_6$, $S_7$}, $S_i$, i=0, 1, . . . , 7 indicates whether $i^{th}$ SRS resource is selected.

In some instances, it may be possible that the number of PUSCH layers that can be scheduled by the network can be limited, for a given wireless device. In such a scenario, it may be possible to reduce the bitwidth of the SRI, at least under some circumstances, such as if the bitwidth of the SRI is designed to be dependent on the maximum number of PUSCH layers that can be scheduled by the network. The maximum number of PUSCH layers that can be scheduled by the network ("$L_{max}$") may be determined based on NR RRC configuration for the wireless device (e.g., in a parameter such as maxMIMO-Layers in PUSCH-ServingCellConfig), and/or based on UE reported capability (e.g., a capability indication for the maximum number of PUSCH layers supported by the UE for the serving cell for non-codebook-based operation), which may be reported as per feature set per component carrier (per component carrier per band per band combination). In some instances, in the same band per band combination, if the UE reports multiple maximum numbers corresponding to different component carriers, it may be the case that the smallest reported maximum number of PUSCH layers is considered as $L_{max}$. Alternatively, in the same band per band combination, if the UE reports multiple maximum numbers corresponding to different component carriers, it may be the case that the largest reported maximum number of PUSCH layers is considered as $L_{max}$.

As one possibility for potentially limiting the bitwidth of the SRI field when $L_{max}$ is configured, it may be specified or configured that the SRI can be used to indicate any combination of SRS resources up to $L_{max}$ SRS resources among the 8 SRS resources for 8 TX non-codebook PUSCH operation. In such a scenario, the bitwidth of the SRI may be calculated as:

$$\left\lceil \log_2\left(\sum_{k=1}^{L_{max}} C(k, 8)\right)\right\rceil,$$

where $$C(k, 8) = \frac{8!}{k! * (8-k)!}$$

is the number of possible choices of selecting k out of 8 candidate values, and $L_{maxis}$ the maximum number of uplink transmission layers configured to be scheduled by the cellular base station. FIG. 6 is a table illustrating possible SRI bitwidths corresponding to possible $L_{maxis}$ values using such an approach, according to some embodiments.

As another approach, it may be possible to pre-determine or configure a rank threshold (which may also be referred to as $R_{th}$) for the wireless device or more generally for the network or serving cell via RRC. When the number of PUSCH layers is less than $R_{th}$, it may be the case that SRI can be used to select any combination of the SRS resources from the 8 SRS resources. When the number of PUSCH layers is equal to or greater than $R_{th}$, it may be the case that SRI can be used to select only a restricted subset of combinations of the SRS resources from the 8 SRS resources. For the restricted subset, for each possible number of PUSCH layers N, it may be the case that the SRI can only be used to select any combination of the SRS resources from the first M SRS resources among the 8 SRS resources, where N≤M≤8. Note that it may also be possible to use a variant design in which N≤M≤8, with a special case in which M=8 is only allowed when N=8, e.g., since it may be the case that the number of possible combinations is only meaningfully restricted when M<8 is true. FIG. 7 is a table illustrating possible SRI values and the corresponding selected SRS resources according to such an approach in an exemplary scenario in which $L_{max}$=8, $R_{th}$=2, and M=N.

As another approach, it may be possible to pre-determine or configure a subset of uplink rank values for the wireless device or more generally for the network or serving cell via RRC. When the number of PUSCH layers is in the subset, it may be the case that SRI can be used to select any combination of the SRS resources from the 8 SRS resources. When the number of PUSCH layers is not in the subset, it may be the case that SRI can be used to select only a restricted subset of combinations of the SRS resources from the 8 SRS resources. For the restricted subset, for each possible number of PUSCH layers N, it may be the case that the SRI can only be used to select any combination of the SRS resources from the first M SRS resources among the 8 SRS resources, where N≤M≤8. As in a rank-threshold-based approach, it may also be possible to use a variant design in which N≤M≤8, with a special case in which M=8 is only allowed when N=8, e.g., since it may be the case that the number of possible combinations for rank value in the second subset is only meaningfully restricted when M<8 is true. Alternatively, it may be possible that no special case for N=8 is needed for such a design variant for a rank-subset-based approach, e.g., if rank 8 is generally configured or specified as being in the subset of uplink rank values for which the SRI can be used to select any combination of the SRS resources.

As a still further possibility, it may be possible for network configuration of a custom SRI to SRS resource selection mapping for a UE for 8 TX non-codebook PUSCH operation. A UE may provide an indication of whether the UE supports such a mode of operation. Additionally, or alternatively, it may be possible for a UE to report the maximum number of entries that can be configured in the network configuration of such a custom SRI to SRS resource selection mapping, e.g., to limit the UE memory requirement to support such an approach. For such a UE, the custom SRI to SRS resource selection mapping can be configured using RRC signaling, or MAC CE signaling, as various possibilities.

For non-coherent codebook PUSCH operation, there may be several TPMI design options for supporting 8 TX antenna port operation. As one possibility, it may be the case that all of the possible port selections are allowed and can be signaled using the TPMI field. For example, similar to an 8-bit SRI field design, it may be possible to use an 8-bit bitmap (e.g., the bitwidth of the TPMI may be fixed to 8 for 8 TX antenna port uplink operation), where each bit of the bitmap is associated with a TX antenna port, and if the bit associated with a TX antenna port is set, that may indicate that the corresponding TX antenna port is selected.

Figures 8, 9:
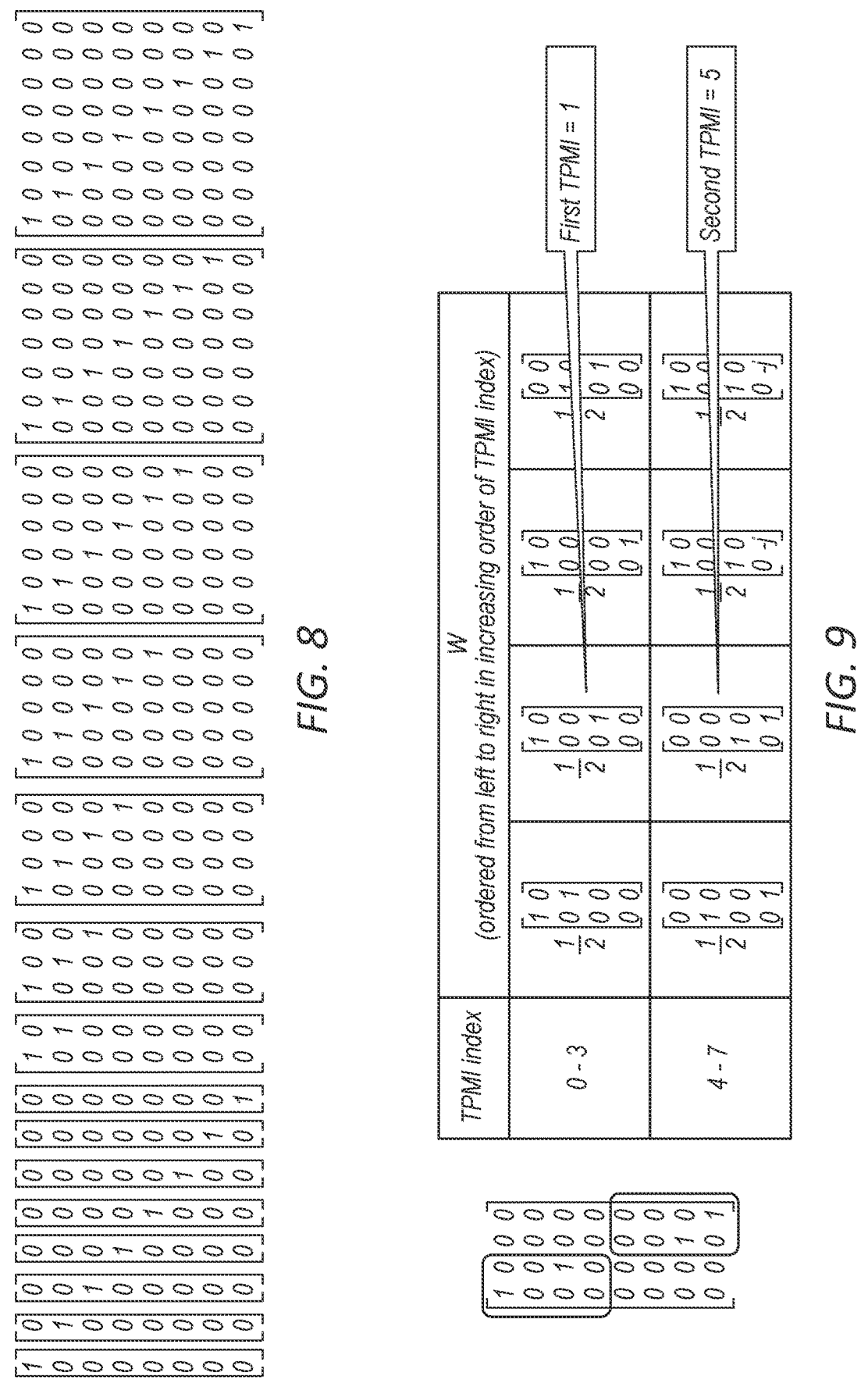

An approach in which a rank threshold ($R_{th}$) can be pre-determined or configured for the wireless device (or more generally for the network or serving cell) may also be possible for non-coherent codebook PUSCH operation, at least according to some embodiments. In such a scenario, when the number of PUSCH layers is less than $R_{th}$, it may be the case that TPMI can be used to select any combination of the TX antenna ports from the 8 TX antenna ports. When the number of PUSCH layers is equal to or greater than $R_{th}$, it may be the case that TPMI can be used to select only a restricted subset of combinations of the TX antenna ports from the 8 TX antenna ports. For the restricted subset, for each possible number of PUSCH layers N, it may be the case that the TPMI can only be used to select any combination of the TX antenna ports from the first M TX antenna ports among the 8 TX antenna ports, where N≤M≤8. Note that it may also be possible to use a variant design in which N≤M≤8, with a special case in which M=8 is only allowed when N=8, e.g., since it may be the case that the number of possible combinations is only meaningfully restricted when M<8 is true. FIG. 8 illustrates possible precoding matrices that could be indicated by TPMI values for such a rank threshold-based TPMI design approach in an exemplary scenario in which $R_{th}$=2, and M=N.

An approach in which a subset of uplink rank values can be pre-determined or configured for the wireless device (or more generally for the network or serving cell) may also be possible for non-coherent codebook PUSCH operation, at least according to some embodiments. In such a scenario, when the number of PUSCH layers is in the subset, it may be the case that TPMI can be used to select any combination of the TX antenna ports from the 8 TX antenna ports. When the number of PUSCH layers is not in the subset, it may be the case that TPMI can be used to select only a restricted subset of combinations of the TX antenna ports from the 8 TX antenna ports. For the restricted subset, for each possible number of PUSCH layers N, it may be the case that the TPMI can only be used to select any combination of the TX antenna ports from the first M TX antenna ports among the 8 TX antenna ports, where N≤M≤8. As in a rank-threshold-based approach, it may also be possible to use a variant design in which N≤M≤8, with a special case in which M=8 is only allowed when N=8, e.g., since it may be the case that the number of possible combinations for rank value in the second subset is only meaningfully restricted when M<8 is true. Alternatively, it may be possible that no special case for N=8 is needed for such a design variant for a rank-subset-based approach, e.g., if rank 8 is generally configured or specified as being in the subset of uplink rank values for which the TPMI can be used to select any combination of the TX antenna ports.

As another possibility, multiple independent TPMI can be indicated to support 8 TX antenna port non-coherent codebook PUSCH operation. Each TPMI may correspond to a 4 TX antenna port TPMI. For a given number of network-indicated PUSCH layers N, it may be possible that the PUSCH layers are split as equally as possible between the first and second TPMI, e.g., such that the first [N/2] PUSCH layers may be indicated by the first TPMI over the first 4 SRS ports, while the last [N/2] PUSCH layers may be indicated by the second TPMI over the last 4 SRS ports. As another possibility, the network may be able to flexibly split the PUSCH layers between the first and second TPMI. In such a scenario, the network may indicate the number of PUSCH layers from the first TPMI; for each TPMI, it may be the case that the number of PUSCH layers may be equal to or less than 4. FIG. 9 illustrates aspects of one possible example scenario in which such an approach is used. As shown, in the illustrated scenario, a first TPMI may be provided to indicate the codebook selection for the first 4 SRS ports, while a second TPMI may be provided to indicate the codebook selection for the last 4 SRS ports. The selections may be used to populate the diagonal quadrants of the 8 TX antenna port precoding matrix, while the remaining off-diagonal quadrants of the 8 TX antenna port precoding matrix may be populated with 0s.

Figure 10A:
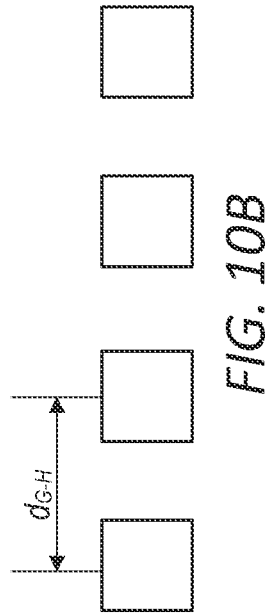
FIGS. 10A-10D illustrate exemplary aspects of various possible partial coherent transmit antenna configurations, according to some embodiments.
Figure 10B:
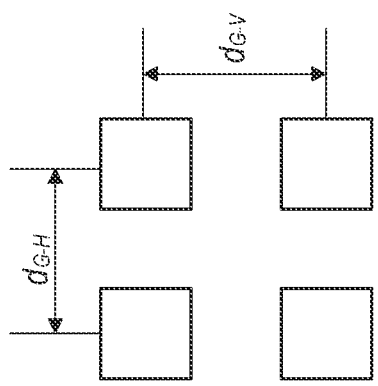
Figure 10C:
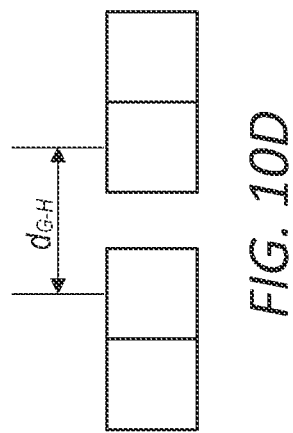
Figure 10D:
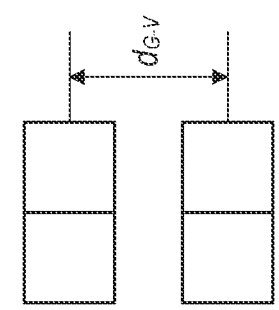

For 8 TX partial coherent codebook PUSCH operation, there may be multiple possible partial coherent TX antenna configurations. FIG. 10 illustrates several such possible configurations. In FIGS. 10A-10B, 4×2 configurations are illustrated, in which there may be 4 coherent antenna groups, where each antenna group has 2 coherent antenna elements. There may be no coherency across different antenna groups, at least according to some embodiments. In FIGS. 10C-10D, 2×4 configurations are illustrated, in which there may be 2 coherent antenna groups, where each antenna group has 4 coherent antenna elements. Similar to the 4×2 configurations, there may be no coherence across different antenna groups, at least according to some embodiments.

For both 4×2 and 2×4 partial coherent codebook 8 TX PUSCH operation, it may be possible to provide multiple coherent TPMI, for example where each TPMI corresponds to a 2 TX or 4 TX antenna port TPMI. Across different antenna groups, it may be possible to use a fixed rank (number of layers) splitting approach, for example such that if the number of layers is divisible by the number of coherent antenna groups, then each coherent antenna group may contain the same number of PUSCH layers, and otherwise 1 more PUSCH layer may be allocated to the first consecutive coherent antenna groups to account for any remaining PUSCH layers. Thus, as an example, in a 4 coherent antenna group configuration with rank=6, the rank splitting could be assigned in a fixed manner as {2,2,1,1}. As another possibility, the rank splitting can be flexible and can be indicated by the network.

Figure 11:
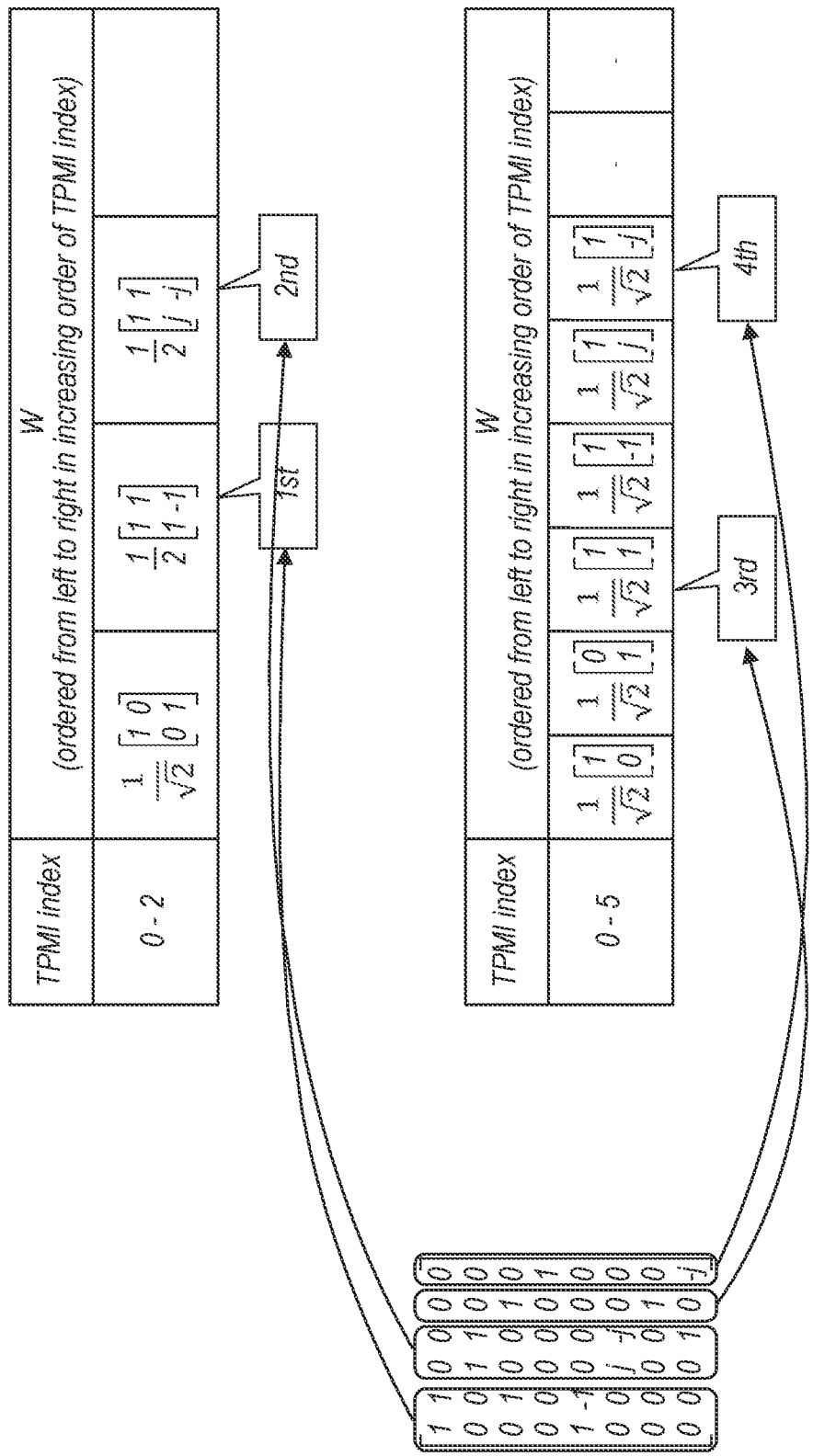
FIG. 11 illustrates aspects of one possible example scenario in which a TPMI design approach is used in which four 2 antenna port TPMIs are provided for partial coherent codebook uplink operation, according to some embodiments.

For 8 TX partial coherent codebook PUSCH operation, for a 4×2 configuration, the TPMI may be created from coherent TPMI with 2 ports. As one possibility, it may be assumed that port (0,4) form the first coherent antenna group, port (1,5) form the second coherent antenna group, port (2,6) form the third coherent antenna group, and port (3,7) form the fourth coherent antenna group. FIG. 11 illustrates aspects of one possible example scenario in which such an approach is used. As shown, in the illustrated scenario, 4 different 2 antenna port TPMI may be provided and may be used by the UE to populate an 8 TX precoding matrix. Two of the 2 antenna port precoding matrices may be for two-layer transmission, and may be used to allocate two PUSCH layers to each of the first and second coherent antenna groups. The remaining two 2 antenna port precoding matrices may be for one-layer transmission, and may be used to allocate one PUSCH layer to each of the third and fourth coherent antenna groups. Note that other antenna port groupings for 4×2 configurations are also possible, such as (0,2)/(1,3)/(4,6)/(5,7), as another possibility.

Figure 12:
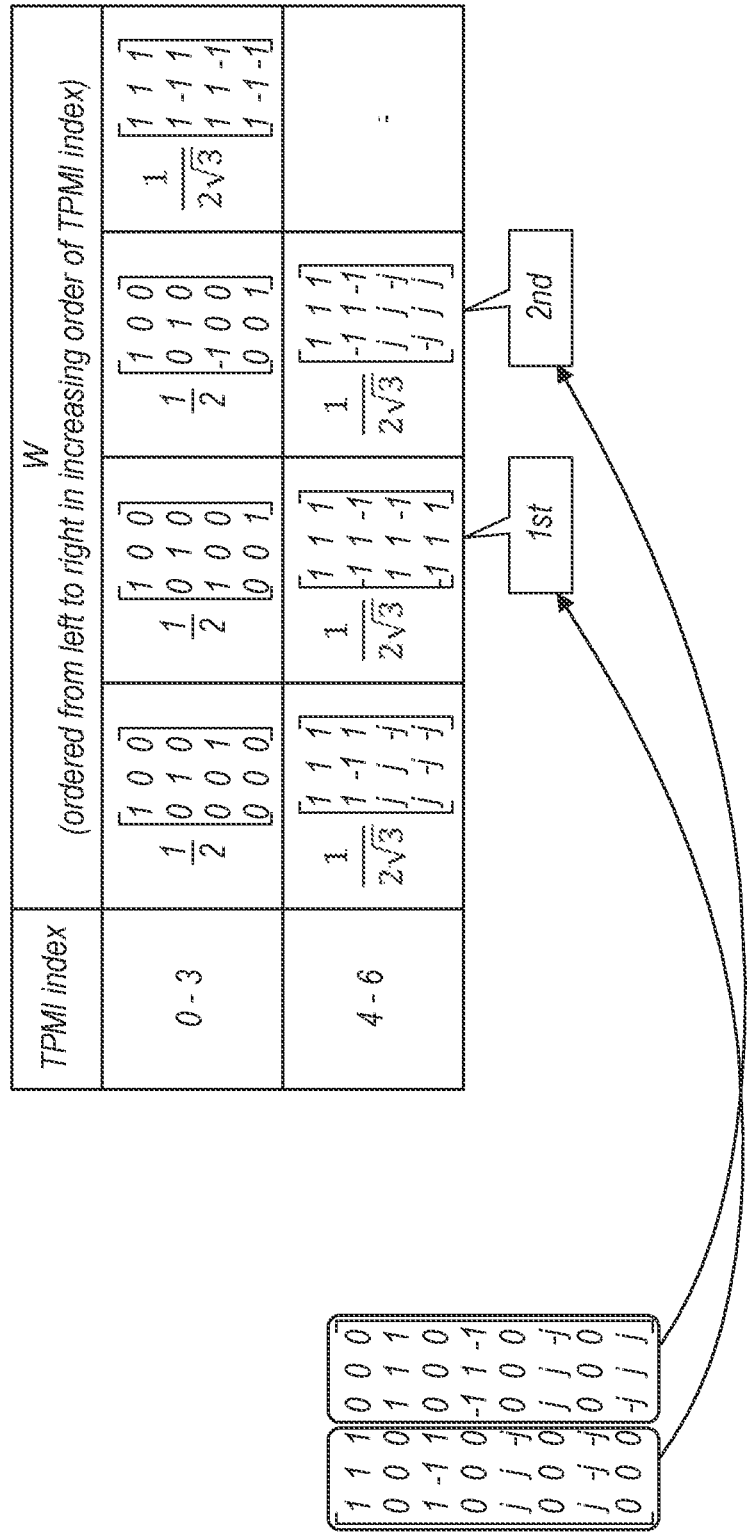
FIG. 12 illustrates aspects of one possible example scenario in which a TPMI design approach is used in which two 4 antenna port TPMIs are provided for partial coherent codebook uplink operation, according to some embodiments.

For 8 TX partial coherent codebook PUSCH operation, for a 2×4 configuration, the TPMI may be created from coherent TPMI with 4 ports. As one possibility, it may be assumed that port (0,2,4,6) form the first coherent antenna group, and port (1,3,5,7) form the second coherent antenna group. FIG. 12 illustrates aspects of one possible example scenario in which such an approach is used. As shown, in the illustrated scenario, 2 different 4 antenna port TPMI may be provided and may be used by the UE to populate an 8 TX precoding matrix. Each of the 4 antenna port precoding matrices may be for three-layer transmission, and may be used to allocate three PUSCH layers to each of the first and second coherent antenna groups.

In the following further exemplary embodiments are provided.

One set of embodiments may include an apparatus, comprising: a processor configured to cause a wireless device to: establish a wireless link with a cellular base station; perform sounding reference signal (SRS) transmissions on each of 8 SRS resources, wherein each SRS resource is associated with a transmit (TX) antenna port; receive an indication from the cellular base station of an 8 TX antenna port uplink configuration to use, wherein the indication of the 8 TX antenna port uplink configuration includes an SRS resource indicator (SRI); and perform uplink communication with the cellular base station using the 8 TX antenna port uplink configuration.

According to some embodiments, the SRI includes an 8-bit bitmap, wherein each bit of the 8-bit bitmap indicates whether a TX antenna port associated with an SRS resource is selected for the 8 TX antenna port configuration.

According to some embodiments, the processor is further configured to cause the wireless device to: determine a maximum number of uplink transmission layers configured to be scheduled by the cellular base station; and determine a bitwidth of the SRI based at least in part on the maximum number of uplink transmission layers configured to be scheduled by the cellular base station.

According to some embodiments, the processor is further configured to cause the wireless device to: receive radio resource control (RRC) configuration information indicating the maximum number of uplink transmission layers configured to be scheduled by the cellular base station, wherein the maximum number of uplink transmission layers configured to be scheduled by the cellular base station is determined based at least in part on the RRC configuration information.

According to some embodiments, the processor is further configured to cause the wireless device to: transmit wireless device capability information indicating a number of uplink transmission layers supported by the wireless device for non-codebook based uplink operation, wherein the maximum number of uplink transmission layers configured to be scheduled by the cellular base station is determined based at least in part on the wireless device capability information.

According to some embodiments, the wireless device capability information indicating the number of uplink transmission layers supported by the wireless device for non-codebook based uplink operation is reported on a per component carrier per band per band combination basis.

According to some embodiments, the bitwidth of the SRI is determined as:

$$\left\lceil \log_2\left(\sum_{k=1}^{L_{max}} C(k, 8)\right) \right\rceil,$$

where $$C(k, 8) = \frac{8!}{k! * (8-k)!}$$

is a number of possible choices of selecting k out of 8 candidate values, where $L_{max}$ is the maximum number of uplink transmission layers configured to be scheduled by the cellular base station.

Another set of embodiments may include a method, comprising: by a wireless device: establishing a wireless link with a cellular base station; performing sounding reference signal (SRS) transmissions on each of 8 SRS resources, wherein each SRS resource is associated with a transmit (TX) antenna port; receiving an indication from the cellular base station of an 8 TX antenna port uplink configuration to use, wherein the indication of the 8 TX antenna port uplink configuration includes an SRS resource indicator (SRI); and performing uplink communication with the cellular base station using the 8 TX antenna port uplink configuration.

According to some embodiments, the method further comprises: determining a first subset of possible uplink rank values for the wireless link with the cellular base station, wherein for uplink rank values in the first subset of possible uplink rank values, the SRI supports selection of any combination of SRS resources from the 8 SRS resources, wherein for uplink rank values not in the first subset of possible uplink rank values, the SRI supports selection of a subset of possible combinations of SRS resources from the 8 SRS resources.

According to some embodiments, for rank values not in the first subset of possible uplink rank values, for each possible number of uplink transmission layers N, the SRI supports selection of any combination of the SRS resources from the first M SRS resources of the 8 SRS resources, wherein N≤M≤8.

According to some embodiments, the method further comprises: receiving SRI to SRS resource selection mapping information for the wireless device from the cellular base station, wherein the SRI indicates to use an SRS resource selection associated with the SRI in the SRI to SRS resource selection mapping information as the 8 TX antenna port uplink configuration.

According to some embodiments, the method further comprises: transmitting an indication to the cellular base station of one or more of: whether the wireless device supports configuration of SRI to SRS resource selection mapping information; or a number of SRI to SRS resource selection mapping entries supported by the wireless device.

Yet another set of embodiments may include a cellular base station, comprising: an antenna; a radio operably coupled to the antenna; and a processor operably coupled to the radio; wherein the cellular base station is configured to: establish a wireless link with a wireless device; receive sounding reference signal (SRS) transmissions from the wireless device on each of 8 SRS resources, wherein each SRS resource is associated with a transmit (TX) antenna port; provide an indication to the wireless device of an 8 TX antenna port uplink configuration to use, wherein the indication of the 8 TX antenna port uplink configuration includes an SRS resource indicator (SRI) configured to indicate a non-codebook uplink configuration; and receive uplink communication from the wireless device, wherein the uplink communication is transmitted using the 8 TX antenna port uplink configuration.

According to some embodiments, the SRI includes an 8-bit bitmap, wherein each bit of the 8-bit bitmap indicates whether a TX antenna port associated with an SRS resource is selected for the 8 TX antenna port configuration.

According to some embodiments, the cellular base station is further configured to: determine a maximum number of uplink transmission layers to schedule for the wireless device; and determine a bitwidth of the SRI based at least in part on the maximum number of uplink transmission layers to schedule for the wireless device.

According to some embodiments, the cellular base station is further configured to: provide an indication to the wireless device of the maximum number of uplink transmission layers to schedule for the wireless device.

According to some embodiments, the cellular base station is further configured to: receive wireless device capability information indicating a number of uplink transmission layers supported by the wireless device for non-codebook based uplink operation, wherein the maximum number of uplink transmission layers to scheduled for the wireless device is determined based at least in part on the wireless device capability information.

According to some embodiments, the cellular base station is further configured to: determine an uplink rank threshold for the wireless link with the cellular base station, wherein for rank values below the uplink rank threshold, the SRI supports selection of any combination of SRS resources from the 8 SRS resources, wherein for rank values equal to or greater than the uplink rank threshold, the SRI supports selection of a subset of possible combinations of SRS resources from the 8 SRS resources.

According to some embodiments, the cellular base station is further configured to: transmit SRI to SRS resource selection mapping information to the wireless device; and select the SRI for the wireless device based at least in part on the SRI to SRS resource selection mapping information, wherein the SRI indicates to use an SRS resource selection associated with the SRI in the SRI to SRS resource selection mapping information as the 8 TX antenna port uplink configuration.

According to some embodiments, the cellular base station is further configured to: receive an indication from the wireless device of one or more of: whether the wireless device supports configuration of SRI to SRS resource selection mapping information; or a number of SRI to SRS resource selection mapping entries supported by the wireless device.

A further set of embodiments may include an apparatus, comprising: a processor configured to cause a wireless device to: establish a wireless link with a cellular base station; receive an indication from the cellular base station of an 8 transmit (TX) antenna port uplink configuration to use, wherein the indication of the 8 TX antenna port uplink configuration includes one or more transmit precoding matrix indicators (TPMIs) configured to indicate a codebook uplink configuration; and perform uplink communication with the cellular base station using the 8 TX antenna port uplink configuration.

According to some embodiments, the indication of the 8 TX antenna port uplink configuration includes one or more TPMIs configured to indicate a non-coherent codebook uplink configuration.

According to some embodiments, the TPMI includes an 8-bit bitmap, wherein each bit of the 8-bit bitmap indicates whether a TX antenna port is selected for the 8 TX antenna port configuration.

According to some embodiments, the processor is further configured to cause the wireless device to: determine an uplink rank value subset for the wireless link with the cellular base station, wherein for uplink rank values in the uplink rank value subset, the TPMI supports selection of any combination of TX antenna ports from the 8 TX antenna ports, wherein for uplink rank values not in the uplink rank value subset, the TPMI supports selection of a subset of possible combinations of TX antenna ports from the 8 TX antenna ports.

According to some embodiments, for rank values not in the uplink rank value subset for the wireless link with the cellular base station, for each possible number of uplink transmission layers N, the TPMI supports selection of any combination of the TX antenna ports from the first M TX antenna ports of the 8 TX antenna ports, wherein N≤M≤8.

According to some embodiments, the indication of the 8 TX antenna port uplink configuration includes two 4 TX antenna port TPMIs.

A still further set of embodiments may include a method, comprising: by a wireless device: establishing a wireless link with a cellular base station; receiving an indication from the cellular base station of an 8 transmit (TX) antenna port uplink configuration to use, wherein the indication of the 8 TX antenna port uplink configuration includes one or more transmit precoding matrix indicators (TPMIs) configured to indicate a codebook uplink configuration; and performing uplink communication with the cellular base station using the 8 TX antenna port uplink configuration.

According to some embodiments, the indication of the 8 TX antenna port uplink configuration includes a plurality of TPMIs configured to indicate a partial-coherent codebook uplink configuration.

According to some embodiments, the plurality of TPMIs include a TPMI for each of multiple coherent antenna groups for the wireless device.

According to some embodiments, the plurality of TPMIs include TPMIs that configure different numbers of uplink transmission layers.

According to some embodiments, the 8 TX antenna port configuration includes 4 coherent antenna groups, wherein each coherent antenna group includes 2 antenna elements, wherein the indication of the 8 TX antenna port uplink configuration includes a 2 TX antenna port TPMI for each of the 4 coherent antenna groups.

According to some embodiments, the 8 TX antenna port configuration includes 2 coherent antenna groups, wherein each coherent antenna group includes 4 antenna elements, wherein the indication of the 8 TX antenna port uplink configuration includes a 4 TX antenna port TPMI for each of the 2 coherent antenna groups.

Yet another set of embodiments may include a cellular base station, comprising: an antenna; a radio operably coupled to the antenna; and a processor operably coupled to the radio; wherein the cellular base station is configured to: establish a wireless link with a wireless device; provide an indication to the wireless device of an 8 transmit (TX) antenna port uplink configuration to use, wherein the indication of the 8 TX antenna port uplink configuration includes one or more transmit precoding matrix indicators (TPMIs) configured to indicate a codebook uplink configuration; and receive uplink communication from the wireless device, wherein the uplink communication is transmitted using the 8 TX antenna port uplink configuration.

According to some embodiments, the indication of the 8 TX antenna port uplink configuration includes one or more TPMIs configured to indicate a non-coherent codebook uplink configuration.

According to some embodiments, the TPMI includes an 8-bit bitmap, wherein each bit of the 8-bit bitmap indicates whether a TX antenna port is selected for the 8 TX antenna port configuration.

According to some embodiments, the cellular base station is further configured to: determine a subset of possible uplink rank values for the wireless device, wherein for uplink rank values in the determined subset of possible uplink rank values for the wireless device, the TPMI supports selection of any combination of TX antenna ports from the 8 TX antenna ports, wherein for uplink rank values not in the determined subset of possible uplink rank values for the wireless device, the TPMI supports selection of a subset of possible combinations of TX antenna ports from the 8 TX antenna ports.

According to some embodiments, the indication of the 8 TX antenna port uplink configuration includes a plurality of TPMIs configured to indicate a partial-coherent codebook uplink configuration.

According to some embodiments, the plurality of TPMIs include a TPMI for each of multiple coherent antenna groups for the wireless device.

According to some embodiments, the one or more TPMIs include multiple TPMIs that configure different numbers of uplink transmission layers.

According to some embodiments, the cellular base station is further configured to: provide an indication of uplink transmission layer splitting between the multiple TPMIs.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to perform operations comprising:
receiving, from a cellular base station, an indication including one or more transmit precoding matrix indicators (TPMIs) configured to indicate an 8 transmit (TX) antenna port uplink configuration, wherein:
the 8 TX antenna port uplink configuration includes 2 antenna port groups, each antenna port group includes 4 antenna ports, and
the 8 TX antenna port uplink configuration includes a 4 TX antenna port precoding matrix for each of the 2 antenna port groups; and
performing uplink communication with the cellular base station using the 8 TX antenna port uplink configuration.

2. The apparatus of claim 1, wherein the 8 TX antenna port uplink configuration is a partial-coherent codebook uplink configuration.

3. The apparatus of claim 1, wherein the one or more TPMIs include TPMIs that configure different numbers of uplink transmission layers.

4. The apparatus of claim 1, wherein the 8 TX antenna port uplink configuration includes transmission layer splitting evenly between the 2 antenna port groups.

5. The apparatus of claim 1, wherein the 8 TX antenna port uplink configuration includes transmission layer splitting between the 2 antenna port groups, wherein a first N/2 layers of N layers are associated with a first antenna port group of the 2 antenna port groups and remaining layers of the N layers being indicated by a second antenna port group of the 2 antenna port groups.

6. The apparatus of claim 1, wherein the 8 TX antenna port uplink configuration includes transmission layer splitting between the 2 antenna port groups, wherein the transmission layer splitting is indicated by the cellular base station.

7. The apparatus of claim 1, wherein:
a first antenna port group of the 2 antenna port groups comprises antenna ports 0, 2, 4 and 6; and
a second antenna port group of the 2 antenna port groups comprises antenna ports 1, 3, 5 and 7.

8. The apparatus of claim 1, wherein each of the 2 antenna port groups is a coherent antenna port group.

9. A method, comprising:
receiving, from a cellular base station, an indication including one or more transmit precoding matrix indicators (TPMIs) configured to indicate an 8 transmit (TX) antenna port uplink configuration, wherein:
the 8 TX antenna port uplink configuration includes 4 antenna port groups, each antenna port group includes 2 antenna ports, and
the 8 TX antenna port uplink configuration includes a 2 TX antenna port precoding matrix for each of the 4 antenna port groups; and
performing uplink communication with the cellular base station using the 8 TX antenna port uplink configuration.

10. The method of claim 9, wherein the 8 TX antenna port uplink configuration is a partial-coherent codebook uplink configuration.

11. The method of claim 9, wherein the one or more TPMIs include TPMIs that configure different numbers of uplink transmission layers.

12. The method of claim 9, wherein the 8 TX antenna port uplink configuration includes transmission layer splitting evenly between the 4 antenna port groups.

13. The method of claim 9, wherein the 8 TX antenna port uplink configuration includes transmission layer splitting between the 4 antenna port groups, wherein a first N/2 layers of N layers are associated with a first antenna port group of the 4 antenna port groups and remaining layers of the N layers being indicated by a second antenna port group of the 4 antenna port groups.

14. The method of claim 9, wherein the 8 TX antenna port uplink configuration includes transmission layer splitting between the 4 antenna port groups, wherein the transmission layer splitting is indicated by the cellular base station.

15. The method of claim 9, wherein:
a first antenna port group of the 4 antenna port groups comprises antenna ports 0 and 4;
a second antenna port group of the 4 antenna port groups comprises antenna ports 1 and 5;
a third antenna port group of the 4 antenna port groups comprises antenna ports 2 and 6; and
a fourth antenna port group of the 4 antenna port groups comprises antenna ports 3 and 7.

16. The method of claim 9, wherein each of the 4 antenna port groups is a coherent antenna port group.

17. A method, comprising:
transmitting, to a wireless device, an indication including one or more transmit precoding matrix indicators (TPMIs) configured to indicate an 8 transmit (TX) antenna port uplink configuration, wherein:
the 8 TX antenna port uplink configuration includes 4 antenna port groups, each antenna port group includes 2 antenna ports, and
the 8 TX antenna port uplink configuration includes a 2 TX antenna port precoding matrix for each of the 4 antenna port groups; and
receiving, from the wireless device, uplink communication using the 8 TX antenna port uplink configuration.

18. The method of claim 17, wherein the 8 TX antenna port uplink configuration is a partial-coherent codebook uplink configuration.

19. The method of claim 17, wherein the one or more TPMIs include TPMIs that configure different numbers of uplink transmission layers.

20. The method of claim 17, wherein the 8 TX antenna port uplink configuration includes transmission layer splitting evenly between the 4 antenna port groups.

* * * * *